(12) United States Patent
Li et al.

(10) Patent No.: US 7,399,344 B1
(45) Date of Patent: Jul. 15, 2008

(54) HYDROGEN PEROXIDE RECOVERY WITH HYDROPHOBIC MEMBRANE

(75) Inventors: Lin Li, Mount Prospect, IL (US); Kurt M. Vanden Bussche, Des Plaines, IL (US); Anil R. Oroskar, Des Plaines, IL (US); Sanjay N. Gandhi, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 492 days.

(21) Appl. No.: 11/045,642

(22) Filed: Jan. 28, 2005

(51) Int. Cl.
*B01D 53/22* (2006.01)

(52) U.S. Cl. .................. 96/6; 96/4; 96/8; 96/10; 95/45; 95/46; 423/584; 423/585; 210/650

(58) Field of Classification Search ............... 96/4, 96/6, 8, 10, 11; 95/45, 46, 52; 210/640, 210/650; 423/584, 585
See application file for complete search history.

(56) References Cited

U.S. PATENT DOCUMENTS

| | | | | |
|---|---|---|---|---|
| 3,884,777 | A * | 5/1975 | Harke et al. ................ 205/472 |
| 4,144,144 | A | 3/1979 | Radimer et al. ............. 204/82 |
| 4,231,839 | A * | 11/1980 | Barron et al. ............... 423/396 |
| 4,879,041 | A * | 11/1989 | Kurokawa et al. .............. 96/6 |
| 4,895,989 | A * | 1/1990 | Sander et al. .................. 95/52 |
| 5,385,647 | A * | 1/1995 | Brueschke et al. ........... 210/640 |
| 5,662,878 | A * | 9/1997 | Datta et al. ................. 210/640 |
| 5,993,515 | A * | 11/1999 | Sirkar ............................ 96/6 |
| 6,986,802 | B2 * | 1/2006 | Colling et al. .................. 96/6 |
| 7,122,166 | B2 * | 10/2006 | Parrish ....................... 210/640 |
| 2004/0211726 | A1 * | 10/2004 | Baig et al. ................... 210/640 |
| 2005/0242031 | A1 * | 11/2005 | Reusch et al. ............... 210/640 |
| 2006/0131235 | A1 * | 6/2006 | Offeman et al. .................. 96/4 |

* cited by examiner

*Primary Examiner*—Jason M Greene
(74) *Attorney, Agent, or Firm*—Arthur E Gooding

(57) ABSTRACT

An apparatus and process are presented that provide for the separation of hydrogen peroxide from a solution having an acid and hydrogen peroxide.

11 Claims, 2 Drawing Sheets

HYDROGEN PEROXIDE RECOVERY WITH HYDROPHOBIC MEMBRANE

FIELD OF THE INVENTION

This invention relates to the production of hydrogen peroxide. Specifically, the production of hydrogen peroxide in an acidic solution, and the subsequent separation and recycle of the acid from the hydrogen peroxide.

BACKGROUND OF THE INVENTION

Currently the most widely practiced industrial scale production method for hydrogen peroxide is an indirect reaction of hydrogen and oxygen employing alkylanthraquinone as the working material. In a first catalytic hydrogenation step, the alkylanthraquinone, dissolved in a working solution comprising organic solvents (e.g. diisobutylcarbinol and methyl naphthalene), is converted to alkylanthrahydroquinone. In a separate autoxidation step, this reduced compound is oxidized to regenerate the alkylanthraquinone and yield hydrogen peroxide. Subsequent separation by aqueous extraction, refining, and concentration operations are then employed to give a merchant grade product. In order to be economical, the alkylanthraquinone process requires large scale production of hydrogen peroxide to justify the cost of the subsequent extraction and purification of the hydrogen peroxide.

The direct production of hydrogen peroxide from hydrogen and oxygen is one route to produce hydrogen peroxide without the costly separation and purification associated with the alkylanthraquinone process. However, there are problems associated with this, such as working with combustible mixtures of hydrogen and oxygen in the gas phase, and the low solubility of hydrogen and oxygen at relatively low pressures in water.

It would be convenient and a savings to be able to produce hydrogen peroxide without the complex processes associated with large scale production, or using processes that require continuous addition of chemicals which would require storage and careful handling. In addition, a simpler process that would enable economic production of hydrogen peroxide on a small scale and the periodic production of hydrogen peroxide on an as needed basis can provide for usage of hydrogen peroxide in areas where it would otherwise be inconvenient, such as the need to buy and store hydrogen peroxide.

An aspect of the problem is the separation and recovery of hydrogen peroxide from any chemicals used in the production of the hydrogen peroxide. For small scale processes with periodic production, it is desired to recover substantially all of the intermediate chemicals in use in the process beyond water and air.

SUMMARY OF THE INVENTION

The present invention comprises a method and apparatus for the substantially complete separation of an acid from a solution comprising hydrogen peroxide and acid to generate an aqueous hydrogen peroxide solution. The process includes generating a vapor by evaporating hydrogen peroxide and water from a solution comprising acid and hydrogen peroxide by passing a heated gas stream through the solution. The subsequent vapor generated includes a mist of liquid droplets that are removed by passing the vapor through a hydrophobic membrane to remove the liquid droplets. The acid from the solution is retained in the liquid phase, including the mist of liquid droplets, to generate an acid free hydrogen peroxide solution.

In one embodiment, the invention includes an electrolyzer for oxidizing the acid to form a peracid. The peracid is passed to a hydrolyzer with water to generate a solution of acid and hydrogen peroxide. The acid/hydrogen peroxide solution is passed to the separator which generates a vapor phase for the separation of hydrogen peroxide from the solution.

In this invention, the acid is part of the retentate for returning to the electrolyzer and reusing in the process for generating hydrogen peroxide.

Additional objects, embodiments and details of this invention can be obtained from the following detailed description of the invention.

DETAILED DESCRIPTION OF THE INVENTION

Figure 1:
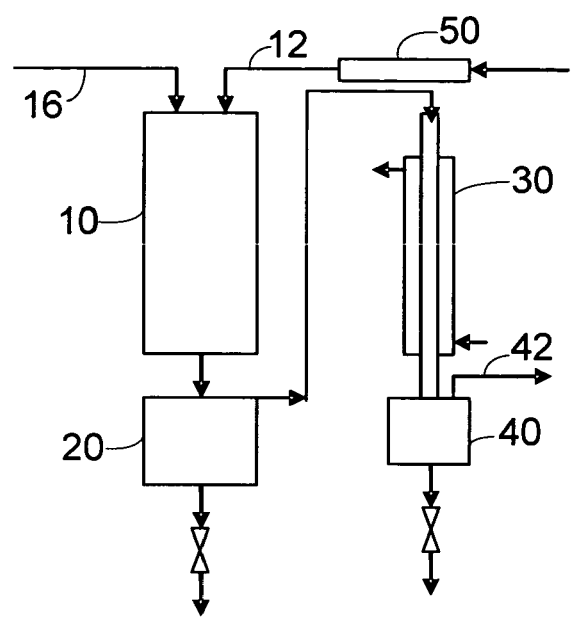
FIG. 1 is a diagram of a hydrogen peroxide recovery device.

Hydrogen peroxide can be produced through electrochemical means. This process produces a hydrogen peroxide solution with a chemical agent for facilitating the oxidation of water to hydrogen peroxide. The use of a chemical agent in the production of the hydrogen peroxide requires the separation and recovery of the hydrogen peroxide from the solution. One separation method is air stripping, wherein the hydrogen peroxide is transferred to a vapor phase and recovered through condensation of the vapor phase. In order to recover adequate amounts, the process requires a high air flow rate. Two major challenges are posed with this separation and recovery method: first there must be adequate design for a large gas-liquid mass transfer area, and second elimination of any liquid entrainment.

An aspect of this invention is the substantially complete recovery for recycle of the chemicals used in the production of hydrogen peroxide. The invention is a method of generating hydrogen peroxide through the use of a powerful oxidizing agent. An electrolyzer is used to convert an oxidizable compound into an oxidizing agent. The oxidizing agent is passed with water to a hydrolyzing reactor which generates a solution comprising hydrogen peroxide and the oxidizable compound. The solution is then passed to a separation unit to separate the hydrogen peroxide from the solution. The separation is performed by passing a gas through the solution to create a vapor-liquid mixture. The hydrogen peroxide is vaporized, and through the creation of a vapor-liquid mixture, transfer of hydrogen peroxide from the liquid to the vapor is facilitated. The transfer is enhanced with the generation of a mist of liquid in the vapor where the liquid is in the form of small droplets. This enhances the surface area for the transfer of hydrogen peroxide from the liquid to the vapor phase.

The liquid droplets comprise the oxidizable compound, and the recovery of the oxidizable compound is accomplished by the substantially complete removal of liquid droplets from the vapor phase. By passing the vapor phase through a hydrophobic membrane, the liquid droplets are prevented from being carried out of the separation unit with the vapor. The liquid droplets are accumulated and removed through a liquid outlet port, and returned to the electrolyzer.

The electrolyzer is operated at a temperature from about 15° C. to about 40° C., and at a pressure from about 100 $kP_A$ (0 psig) to about 800 kP$_A$ (100 psig). In a preferred embodiment, the oxidizable agent is sulfuric acid, and is oxidized in the electrolyzer to persulfuric acid in an aqueous solution. Other preferred oxidizing agents include, but are not limited to, sulfate salts that are oxidizable to persulfate salts, and chlorate compounds that are oxidizable to perchlorate compounds. The use of an electrolytic cell to produce a persulfate is demonstrated in U.S. Pat. No. 4,144,144, which is incorporated by reference in its entirety. The persulfuric acid solution is passed to a hydrolyzing reactor with the addition of water, and heated to reaction conditions to generate hydrogen peroxide in the solution. The hydrolyzing reactor is heated to a temperature from about 40° C. to about 85° C. for the reaction to proceed, generating a solution comprising hydrogen peroxide and sulfuric acid. The hydrolyzing reactor is sized to allow the reaction to reach a desired degree of completion.

The sulfuric acid remains in the liquid phase when heated, and when the hydrogen peroxide solution is passed to the evaporator/separator, a portion of the sulfuric acid is in the liquid droplets generated. The liquid droplets are removed from the vapor phase to recover the sulfuric acid, generating a liquid free vapor with the liquid being collected, cooled and then returned to the electrolyzer. Problems associated with the separation of sulfuric acid and hydrogen peroxide are high surface area needed for adequate separation, and substantially complete recovery of the sulfuric acid by substantially complete elimination of liquid from the vapor phase, which are solved by the present invention.

The droplet free vapor comprises air, hydrogen peroxide and water vapor. The vapor is cooled in a condensing unit and the hydrogen peroxide is collected in an aqueous liquid phase that results from the cooling of the vapor. The aqueous liquid is a substantially sulfate free hydrogen peroxide solution.

One embodiment of the invention involves the use of an air stripper as shown in FIG. 1. An acid/peroxide solution flows into an evaporator 10 through a liquid inlet 16. A stripping gas such as air, or in a non-reactive gas, is passed through a heater 50, to heat the stripping gas. The stripping gas can be any non-reactive gas and for purposes of discussion, air as used hereinafter will mean the stripping gas and can include, but is not limited to, air, nitrogen, argon, carbon dioxide and mixtures thereof. The heated air is passed to the evaporator 10 where the acid/peroxide solution is heated and generates a mist laden effluent gas. The effluent gas is passed to a gas/liquid separator 20, wherein the liquid removed from the effluent gas contains substantially all of the acid used in the process and the vapor is a substantially acid free hydrogen peroxide vapor. The vapor is further passed through a hydrophobic membrane disposed in the separator 20 to remove residual liquid droplets in the vapor phase. The vapor is passed to a condensing unit 30 wherein hydrogen peroxide and water vapor are condensed and collected in a holding tank 40. Air, or a non-reactive gas, is injected into the system through a gas inlet line 12. The stripping gas is vented from the system through an air vent 42 off the holding tank 40 for the condensed peroxide solution.

Figure 2:
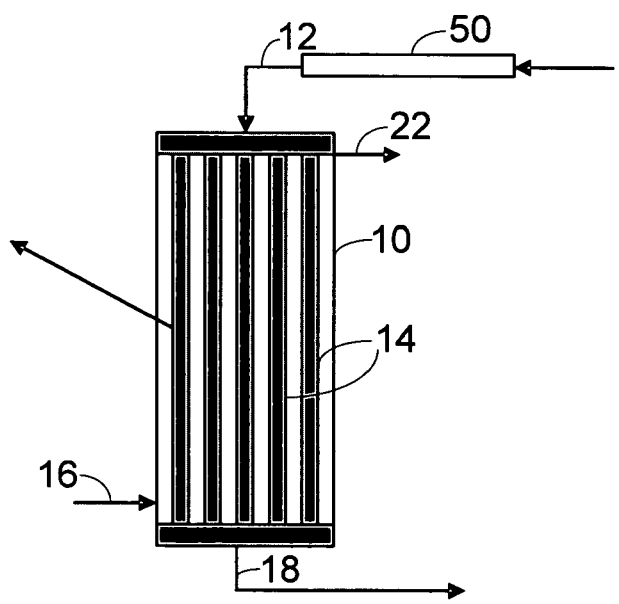
FIG. 2 is a diagram of a membrane module evaporator.

In an alternative, the evaporator 10 can also comprise the gas-liquid separator, as shown in FIG. 2. The evaporator 10 includes a shell having a plurality of hollow fiber membrane tubes 14. The fibers 14 have an inside, or lumen side, and an outside, or shell side and are made of a hydrophobic material to prevent the diffusion of acid through the membrane walls. The liquid acid/hydrogen peroxide solution enters through a liquid inlet 16 to the shell side of the evaporator 10, and air passes through the lumen side of the hollow fibers 14. The fibers 14 provide a large contact surface area for hydrogen peroxide to migrate through and evaporate on the lumen side of the fibers. The hydrogen peroxide is carried out in a gas phase from the evaporator 10, and passed to a condenser. The hollow fibers preferably are small diameter tubes having diameters from 20 to 300 micrometers and can be used to provide a high surface area while having a low pressure drop. The surface areas can be on the order of 10,000 m$^2$/m$^3$ of separator volume. The use of hollow fibers for collecting the vapor as it diffuses through the fiber walls limits the amount of acid transferred to the gas phase. The gas phase comprising hydrogen peroxide and water vapor is subsequently directed through a gas outlet 18 to a condensing unit 30 wherein the hydrogen peroxide is condensed and air is vented. The acid is directed out a liquid outlet 22 for recovery and return to the electrolyzer.

With the evaporation of water and peroxide from the acid/peroxide solution, the viscosity increases, and in turn increases the pressure drop. Optionally, additional water is added to the acid/peroxide solution in the evaporator 10 to reduce the solution viscosity. Optionally, the acid/peroxide solution and air can enter the evaporator 10 on the shell side as a two-phase flow with the air carrying the hydrogen peroxide vapor through the membrane.

Figure 3:
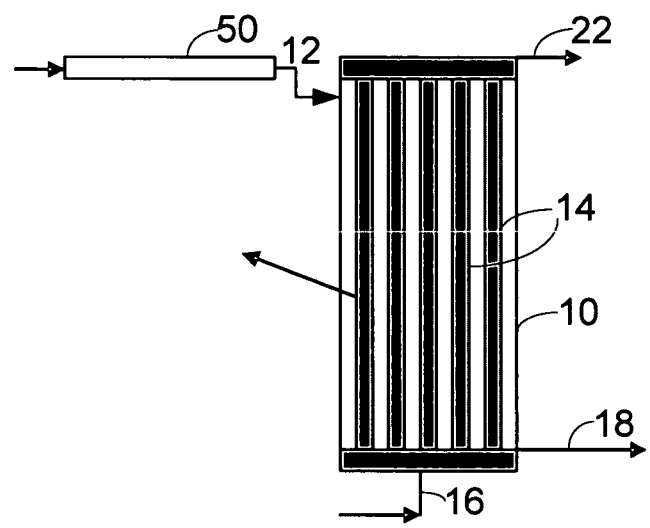
FIG. 3 is a diagram of a second embodiment of a membrane module evaporator.

The high surface area facilitates the transfer of hydrogen peroxide from the liquid to the vapor phase. The evaporation of hydrogen peroxide is accompanied with the evaporation of water. The liquid remaining behind has an increasing concentration of sulfuric acid and with the increasing concentration, the viscosity also increases. The increase in liquid viscosity adversely affects the liquid side mass transfer. In another embodiment, the liquid is fed to the lumen side of the hollow fibers 14, as shown in FIG. 3. By flowing the liquid on the lumen side, liquid phase mass transfer limitations from diffusion are reduced. The hydrogen peroxide permeates the walls of the fibers 14 to the shell side of the evaporator. Air is heated and passed into the shell side of the evaporator 10, and carries out the hydrogen peroxide vapor out the gas outlet 18 to a condensing unit 30. The acid solution is directed out a liquid outlet 22 for recovery and return to the electrolyzer. In this embodiment, the possibility of forming stagnant liquid is significantly reduced.

Figure 4:
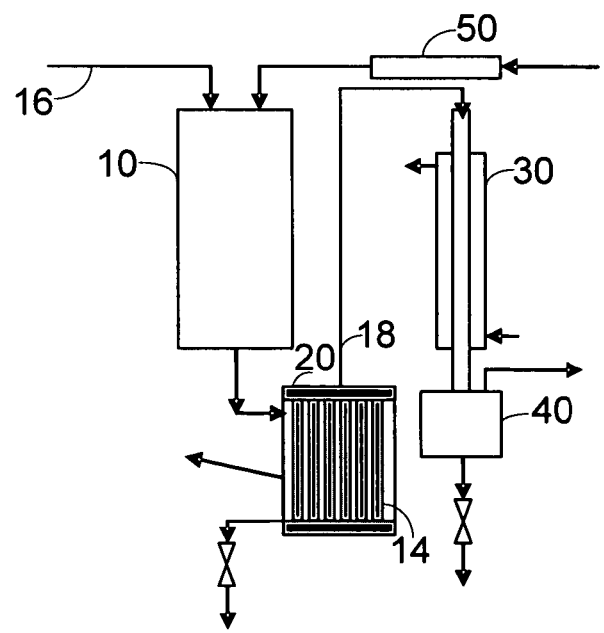
FIG. 4 is a diagram of a second embodiment of a hydrogen peroxide recovery device.

The use of the hydrophobic membrane can also be to substantially remove entrained liquid in the gas stream. In this embodiment, as shown in FIG. 4, the vapor-liquid separation comprises a first stage of gross liquid separation from a mist laden vapor, and passing the mist laden vapor to a vapor liquid separator having a shell side for admitting the liquid laden vapor, and an outlet for a liquid phase. The separator includes a plurality of hollow fibers comprising a hydrophobic material that is permeable to the vapor. The hollow fibers carry the vapor to a vapor side outlet 18. In this embodiment, the first stage can comprise an evaporator 10 wherein air is heated and passed through the acid/hydrogen peroxide solution creating a vapor comprising hydrogen peroxide with a mist of liquid wherein the liquid mist contains acid, and some hydrogen peroxide and a liquid phase. The creation of a liquid mist enhances mass transfer from the liquid to the gas phase. The liquid phase may be collected and separated in the evaporator 10, or may be passed to the gas/liquid separator 20 to provide additional contact time between the vapor phase and the liquid phase. The vapor phase is passed into the separator 20 for removing entrained liquid droplets in the vapor. The separator 20 comprises a plurality of hollow fibers 14 to provide a large surface area to transfer the vapor through the fiber membranes. In order to prevent the acid from traveling through the fiber membrane, the membrane is comprises of a hydrophobic material, and the mist or droplets, accumulate on the fibers 14 and are recovered for return to the electrolyzer.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus that separates hydrogen peroxide from a solution comprising hydrogen peroxide and an acid, comprising:
    a gas-liquid separator having an inlet that receives the solution, a device that heats the gas, an acid outlet, a hydrogen peroxide vapor outlet, and a hydrophobic membrane permeable to hydrogen peroxide vapor produced by heated gas contacting the solution.

2. The apparatus of claim 1 further comprising a hydrogen peroxide vapor condensing unit having an inlet in fluid communication with the hydrogen peroxide vapor outlet, and an outlet.

3. The apparatus of claim 2 further comprising a collection unit having an inlet in fluid communication with the condensing unit outlet, a liquid outlet, and a gas outlet.

4. The apparatus of claim 1 further comprising an evaporator with an inlet for the solution, an inlet of the gas, and an outlet for a mixed phase solution comprising a vapor and liquid.

5. The apparatus of claim 1 wherein the gas-liquid separator comprises:
    a shell having at least one inlet, an outlet for withdrawing a liquid, and an outlet for withdrawing a gas; and
    a plurality of hollow fibers comprised of a material permeable to the hydrogen peroxide vapor and impermeable to the acid.

6. An apparatus that separates hydrogen peroxide from a solution including an acid comprising:
    a vessel having at least one solution inlet, at least one acid outlet, and at least one hydrogen peroxide vapor outlet;
    a membrane permeable to the hydrogen peroxide vapor and impermeable to the acid; and
    means for generating the hydrogen peroxide vapor from the solution.

7. The apparatus of claim 6, wherein the membrane is a hydrophobic membrane.

8. The apparatus of claim 6, further comprising a second inlet admits a gas and facilitates vaporization.

9. The apparatus of claims 6, wherein the permeable membrane is a hollow fiber membrane module comprising a plurality of hollow fibers with fiber walls permeable to the hydrogen peroxide vapor and impermeable to the acid.

10. The apparatus of claim 9, wherein the vessel has a shell side to the fibers and the acid is in fluid communication with the shell side and the hydrogen peroxide vapor is in fluid communication with a lumen side of the fibers.

11. The apparatus of claim 9, wherein the vessel has a shell side to the fibers and the hydrogen peroxide vapor is in fluid communication with the shell side and the acid is in fluid communication with a lumen side of fibers.

\* \* \* \* \*